R. M. EVANS.
AIR PRESSURE INDICATOR FOR PNEUMATIC TIRES.
APPLICATION FILED OCT. 30, 1916.

1,289,712.

Patented Dec. 31, 1918.

Inventor
Robert M. Evans.
By Pierre Barnes
Attorney.

UNITED STATES PATENT OFFICE.

ROBERT M. EVANS, OF SEATTLE, WASHINGTON.

AIR-PRESSURE INDICATOR FOR PNEUMATIC TIRES.

1,289,712.

Specification of Letters Patent.

Patented Dec. 31, 1918.

Application filed October 30, 1916. Serial No. 128,388.

*To all whom it may concern:*

Be it known that I, ROBERT M. EVANS, a citizen of the United States, residing at Seattle, in the county of King and State of Washington, have invented certain new and useful Improvements in Air-Pressure Indicators for Pneumatic Tires, of which the following is a specification.

This invention relates to air-pressure indicating devices for pneumatic tires, and has for its object the provision of a pressure indicator of simple construction that may be applied and indefinitely maintained in operative connection with a tire inlet valve whereby the variations in air pressure within the tire may be observed at all times; and is particularly adapted to indicate when the pressure has fallen below a predetermined minimum of safety whereupon the tire may be supplied with additional air before any damage is caused from traveling upon an insufficiently inflated tire.

The invention consists in the novel construction of an air pressure indicator, and its combination and adaptation of parts, as will be fully described in the following specification, illustrated in the accompanying drawings, and finally set forth in the appended claims.

Figure 1:
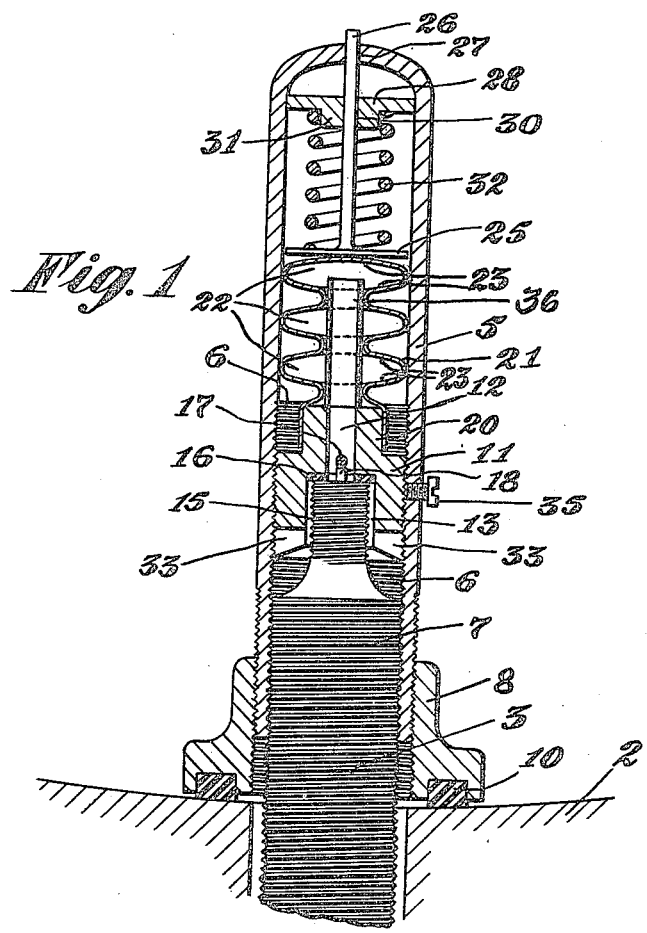

In said drawings, Figure 1 is a view in vertical section of an air pressure indicator embodying my invention shown attached to a tire valve shell.

Figure 2:
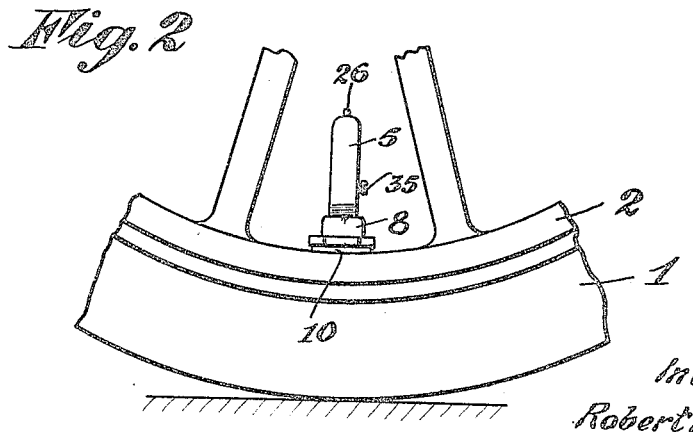

Fig. 2 is a fragmentary view in side elevation on a reduced scale, of an automobile wheel with my indicating device attached thereto.

Referring to said views, the reference numeral 1 indicates a pneumatic tire which is mounted upon the wheel rim 2 in the usual or any suitable manner. A tire inlet valve shell 3 is provided, communicating with the inner tube of said tire, and extending through said rim 2 in the usual manner. 5 denotes the casing of my improved air-pressure indicating devices, which casing is adapted to be secured to valve shell 3 and protects the same from injury superseding the present casing of somewhat similar exterior configuration and appearance. Said casing is formed with interior screw-threads 6 with which it is secured to the external screw-threads 7 of the tire valve shell. The lower exterior portion of the casing is screw-threaded to receive a nut 8 which is in air-tight connection with the tire rim 2 through annular gasket 10.

A block 11 is exteriorly screw-threaded, whereby it may be secured in threaded engagement with the screw-threads 6 at adjusted positions within the interior of the casing 5 and is formed with an axially arranged bore 12. The lower end of said bore is enlarged, as at 13, to receive the reduced neck 15 of the tire valve shell. At the upper end of said enlarged portion of the bore a rubber gasket 16 is positioned to form an air-tight joint at this point, with the upper end of said neck 15.

A tripping device, as 17, is provided in said bore, to engage the valve stem 18 of a valve in the tire valve shell 3, whereby the same is opened simultaneously with the operative securement of the indicator casing with the tire valve shell.

The block 11 is formed with a boss 20 upon its end opposite its engagement with the tire valve, to which an expansible air chamber 21 is fixedly secured, as by solder. Said air chamber is desirably formed of metal, and is provided with a plurality of expansion cells 22 whose upper and lower walls 23 constitute diaphragms against which the air pressure existing within said cells expands more or less in longitudinal directions, as will be clearly understood from an inspection of the drawings.

Superimposed upon said air chamber is a plate 25 having a centrally disposed integral stem 26 extending outwardly axially of the casing and arranged to protrude therefrom through an aperture 27 when the pressure of air in said air chamber is sufficiently great.

A disk 28 is pressed into the end of said casing, having an aperture 30 to receive said stem 26 and a downwardly extending boss 31 whereby a coil-spring 32 is centered which has its opposite end disposed to bear upon said plate 25.

The apertures 27 and 30 may both be formed by boring into the end of said casing after the disk 28 is pressed into its seat, as shown, whereby said apertures may be most reliably alined and a close sliding fit readily made with said stem.

Adjustments of the block 11 axially of the casing may be easily and quickly made through a transverse slot 33 which is formed upon the bottom of said block and which is adapted to be engaged by a screw driver or other similar tool to screw the block in either direction to adjust the tension placed upon said spring 32.

A set screw 35 is arranged to protrude through the wall of said casing and impinge upon the peripheral surface of said block, whereby said block may be maintained in set positions.

Positioned longitudinally within the interior of said air-chamber 21 is a tubular member 36 having its lower end supported upon the upper surface of the boss 20 and its upper end extending in proximity to the upper portion of said air-chamber to serve as a stop to limit the inward travel of the air-chamber 21 when the pressure of air within the tire shall have become sufficiently reduced and to prevent the power of spring 32 acting to crush or injuriously affect the same by causing the air-chamber to retract beyond the limit fixed by said stop.

The length of said stop-member is desirably proportioned to permit the inward travel of said stem 26 under the action of spring 32 to a slight distance only below the outer surface of the casing extremity so that after the disappearance of the outer extremity of the stem 26 from view or touch, the stem can not travel any farther nor can the air-chamber further contract.

It is believed that the operation of my described pressure-indicating devices will be evident from the foregoing description. It may be stated, however, that it is the main object of said devices to indicate the lack of sufficient pressure within the tire and not to act necessarily as a graduated gage to indicate variations in the pressure above a predetermined minimum air-pressure. Therefore the stem 26 is unprovided with graduation marks but is intended to protrude for a slight distance, as indicated in the views, under a normal or sufficient pressure within the tire to maintain them in properly inflated condition. When such inflation, however, is reduced beyond a safe minimum, and the stem recedes within the casing, as may be indicated by sight or by the passing of the hand over the end of the casing, it indicates that the tire pressure is reduced beyond a safe minimum, whereupon the casing may be removed and the tire pressure increased in the usual manner.

Among the advantages of my invention are the simplicity of its construction, whereby the operating mechanism may be inclosed within a cap or casing varying little from the ordinary cap now utilized for inclosing the end of the tire valve; and the convenience and ease with which the condition of air-pressure within the tire can be ascertained by observation or by simply pressing the finger over the end of the casing to determine the position of the said stem 26.

Having described my invention, what I claim, is—

1. An air pressure indicator including a casing having one open end adapted to be secured to a tire valve shell and having an aperture through the other end thereof, a plug member having an axial bore therethrough secured within said casing and adjustable longitudinally thereof, an expansible and collapsible air chamber longitudinally movable within said casing and having an open end attached to the plug member, an indicator stem longitudinally arranged within said casing having one end supported by the other end of said air chamber and having its other end normally extending into the aperture in the end of the casing, and a spring interposed between the air chamber and the second named end of the casing to normally yieldingly hold the air chamber into lapsed position.

2. An air pressure indicator including an elongated casing having one open end adapted to be secured upon a tire valve shell and having a relatively small concentric aperture through the other end thereof, a plug member having an axial bore therethrough secured within said casing and adjustable longitudinally thereof, said plug member being provided with a fixed transverse pin to engage the stem of a tire valve in the shell to hold the same open when the indicator is in operative position, an expansible and collapsible air chamber longitudinally movable within said casing provided with means to limit the collapsing thereof and having an open end attached to the plug member, an indicator stem axially arranged within said casing having one end supported by the other end of said air chamber and having its other end normally extending into the relatively small aperture in the end of the casing, and a spring interposed between the air chamber and the second named end of the casing to normally yieldingly hold the air chamber in collapsed position.

Signed at Seattle, Washington, this 5th day of October, 1916.

ROBERT M. EVANS.

Witness:
E. PETERSON.